(12) United States Patent
Yan et al.

(10) Patent No.: US 11,788,758 B2
(45) Date of Patent: Oct. 17, 2023

(54) AIR CONDITIONER, AND CONTROL METHOD AND DEVICE FOR HEATING SYSTEM THEREOF

(71) Applicants: Hefei Midea Heating & Ventilating Equipment Co., Ltd., Anhui (CN); GD Midea Heating & Ventilating Equipment Co., Ltd., Foshan (CN)

(72) Inventors: Libo Yan, Hefei (CN); Guozhong Yang, Hefei (CN); Mingren Wang, Hefei (CN); Zhijun Tan, Hefei (CN); Shanshan Yang, Hefei (CN)

(73) Assignees: HEFEI MIDEA HEATING & VENTILATING EQUIPMENT CO., LTD., Hefei (CN); GD MIDEA HEATING & VENTILATING EQUIPMENT CO., LTD., Foshan (CN)

(*) Notice: Subject to any disclaimer, the term of this patent is extended or adjusted under 35 U.S.C. 154(b) by 216 days.

(21) Appl. No.: 17/357,850

(22) Filed: Jun. 24, 2021

(65) Prior Publication Data
US 2021/0325074 A1 Oct. 21, 2021

Related U.S. Application Data

(63) Continuation of application No. PCT/CN2019/090143, filed on Jun. 5, 2019.

(30) Foreign Application Priority Data

Dec. 27, 2018 (CN) .......................... 201811613277.6
Dec. 27, 2018 (CN) .......................... 201811613278.0

(51) Int. Cl.
*F24F 11/65* (2018.01)
*F24F 11/64* (2018.01)
(Continued)

(52) U.S. Cl.
CPC .............. *F24F 11/65* (2018.01); *F24F 11/42* (2018.01); *F24F 11/46* (2018.01); *F24F 11/61* (2018.01);
(Continued)

(58) Field of Classification Search
CPC .. F24F 11/65; F24F 11/42; F24F 11/46; F24F 11/61; F24F 11/64; F24F 2110/12;
(Continued)

(56) References Cited

U.S. PATENT DOCUMENTS 4,882,908 A * 11/1989 White ................... F25D 21/006
62/155
7,165,412 B1 * 1/2007 Bean, Jr. ............ H05K 7/20809
62/332

(Continued)

FOREIGN PATENT DOCUMENTS

CN 1752615 3/2006
CN 103307705 A 9/2013
(Continued)

OTHER PUBLICATIONS

Guangdong Meidi Heating Ventilation Equipment Co., Ltd., First Office Action, CN Application No. 201811613277.6, dated Nov. 19, 2019, 12 pgs.
(Continued)

*Primary Examiner* — Alicia M. Choi
(74) *Attorney, Agent, or Firm* — Morgan, Lewis & Bockius LLP

(57) ABSTRACT

A control method for a heating system of an air conditioner, the method includes: obtaining ambient temperature and external heat exchanger evaporation temperature; obtaining external heat exchanger evaporation pressure, and obtaining, according to the external heat exchanger evaporation pressure, corresponding saturation temperature; and controlling
(Continued)

a base plate heating device according to the ambient temperature, the external heat exchanger evaporation temperature, or the saturation temperature. The base plate heating device is controlled according to the ambient temperature, the saturation temperature corresponding to the external heat exchanger evaporation pressure, or the external heat exchanger evaporation temperature, and may avoid freezing of the base plate of an air conditioner, and may ensure normal drainage of the base plate during defrosting to improve the stability and reliability of the air conditioner.

18 Claims, 10 Drawing Sheets

(51) Int. Cl.
| | | |
|---|---|---|
| F24F 11/42 | (2018.01) | |
| F24F 11/46 | (2018.01) | |
| F24F 11/61 | (2018.01) | |
| G05B 19/042 | (2006.01) | |
| F24F 110/12 | (2018.01) | |

(52) U.S. Cl.
CPC ............ *F24F 11/64* (2018.01); *G05B 19/042* (2013.01); *F24F 2110/12* (2018.01); *G05B 2219/2614* (2013.01)

(58) Field of Classification Search
CPC ...... F24F 2140/12; F24F 2140/20; F24F 1/36; G05B 19/042; G05B 2219/2614; F25B 2700/197; F25B 2700/2106; F25B 2700/2117; F25D 21/14; F25D 2321/146
See application file for complete search history.

(56) References Cited

U.S. PATENT DOCUMENTS

| | | | | |
|---|---|---|---|---|
| 9,050,360 | B1 * | 6/2015 | Scaringe | F25B 49/02 |
| 11,118,794 | B1 * | 9/2021 | Longenecker | F24F 1/0093 |
| 2007/0204840 | A1 * | 9/2007 | Abe | F02D 41/1494 |
| | | | | 123/697 |
| 2017/0102723 | A1 * | 4/2017 | Smith | H04L 12/28 |
| 2018/0180306 | A1 * | 6/2018 | Aoyama | F25B 13/00 |
| 2020/0191460 | A1 * | 6/2020 | Larsen | F25B 5/02 |
| 2021/0325074 | A1 | 10/2021 | Yan et al. | |

FOREIGN PATENT DOCUMENTS

| | | | | |
|---|---|---|---|---|
| CN | 103591669 | A | 2/2014 | |
| CN | 103851752 | A | 6/2014 | |
| CN | 103982976 | A | 8/2014 | |
| CN | 105202724 | A | 12/2015 | |
| CN | 105423447 | A | 3/2016 | |
| CN | 106196480 | A | 12/2016 | |
| CN | 106288243 | A | 1/2017 | |
| CN | 106288561 | A | 1/2017 | |
| CN | 106352443 | A | 1/2017 | |
| CN | 106369759 | A | 2/2017 | |
| CN | 106594962 | A | 4/2017 | |
| CN | 106765950 | A | 5/2017 | |
| CN | 106765950 | A * | 5/2017 | ............ F24F 11/30 |
| CN | 106895619 | A | 6/2017 | |
| CN | 107084491 | A | 8/2017 | |
| CN | 107152750 | A | 9/2017 | |
| CN | 107525224 | A | 12/2017 | |
| CN | 206973754 | U | 2/2018 | |
| CN | 107990481 | A | 5/2018 | |
| CN | 108006926 | A | 5/2018 | |
| CN | 108105911 | | 6/2018 | |
| EP | 2299206 | A1 | 3/2011 | |
| EP | 3885662 | A1 | 9/2021 | |
| JP | 2011106771 | A | 6/2011 | |
| JP | 2013208938 | A * | 10/2013 | ......... B60H 1/00385 |
| JP | 2016205716 | A | 12/2016 | |
| JP | 2019020047 | A * | 2/2019 | |
| KR | 20070098164 | A * | 10/2007 | ............ F25B 13/00 |
| KR | 20090081871 | A | 7/2009 | |
| WO | WO 2005049002 | A1 | 6/2005 | |
| WO | WO-2013086386 | A1 * | 6/2013 | ......... B60H 1/00385 |
| WO | WO 2018189859 | A1 | 10/2018 | |
| WO | WO 2020133925 | A1 | 7/2020 | |

OTHER PUBLICATIONS

Hefei Midea HVAC Equipment Co., Ltd., International Search Report and Written Opinion, PCT/CN2019/090143, dated Sep. 27, 2019, 10 pgs.
Guangdong Midea HVAC Equipment Co., Ltd., First Office Action, CN Application No. 201811613278.0, dated Oct. 12, 2019, 16 pgs.
Guangdong Meidi Heating Ventilation Equipment Co., Ltd., The Second Office Action, CN Application No. 201811613277.6, dated Aug, 19, 2020, 14 pgs.
Office Action, IN Application No. 202127030127, dated Mar. 7, 2022, 5 pgs.
Hefei Midea Heating and Ventilating Equipment Co., Ltd., et al., Extended European Search Report, EP Application No. 19902095.9, dated Jan. 4, 2022, 8 pgs.
Midea Group Co., Ltd., CA Office Action, Canadian Patent Application No. 3,124,587, dated Oct. 7, 2022, 3 pgs.
Midea Group Co., Ltd., IPRP, PCT/CN2019/090143, dated Jun. 16, 2021, 6 pgs.

* cited by examiner

AIR CONDITIONER, AND CONTROL METHOD AND DEVICE FOR HEATING SYSTEM THEREOF

CROSS-REFERENCE TO RELATED APPLICATIONS

This application is a continuation of PCT International Application No. PCT/CN2019/090143, filed Jun. 5, 2019, which claims the benefit of Chinese Application No. 201811613277.6, and 201811613278.0, both filed on Dec. 27, 2018, entitled "Air Conditioner, and Control Method and Device for Heating System Thereof," each of which is incorporated herein by reference.

FIELD

The present disclosure relates to the field of an air-conditioning technique, particularly relates to a control method for a heating system of an air conditioner, a control apparatus for a heating system of an air conditioner, and an air conditioner.

BACKGROUND

At present, an air-conditioning system in the related art has been applying in a broadening range, and heating is also required in severe cold areas.

In the related art however, an outdoor unit or its chassis is prone to freeze due to a low external ambient temperature, a low pressure, and a low evaporation temperature, causing a pipeline of the outdoor unit to burst or to be blocked by ice water after defrosting.

SUMMARY OF THE INVENTION

The present disclosure aims to solve at least one of the technical problems in the related art to a certain degree.

For this, a first object of the present disclosure is to provide a control method for a heating system of an air conditioner, which can avoid an chassis of the air conditioner from freezing, and ensure normal drainage for the chassis during defrosting, thereby improving the stability and reliability of the air conditioner. A second object of the present disclosure is to provide a control apparatus for a heating system of an air conditioner.

A third object of the present disclosure is to provide an air conditioner.

For the above object, in a first aspect, the present disclosure provides in embodiments a control method for a heating system of an air conditioner, including: obtaining an ambient temperature and an evaporation temperature of an external heat exchanger; obtaining an evaporation pressure of the external heat exchanger, and obtaining a saturation temperature corresponding to the evaporation pressure of the external heat exchanger; and controlling a chassis heating device according to the ambient temperature, the evaporation temperature of the external heat exchanger, or the saturation temperature.

According to embodiments in the present disclosure, the control method for a heating system of an air conditioner obtains an ambient temperature and an evaporation temperature of an external heat exchanger, obtains an evaporation pressure of the external heat exchanger, and obtains a saturation temperature corresponding to the evaporation pressure of the external heat exchanger; and controls a chassis heating device according to the ambient temperature, the evaporation temperature of the external heat exchanger, or the saturation temperature, such that the chassis heating device is controlled according to the ambient temperature, the evaporation temperature of the external heat exchanger, or the saturation temperature corresponding to the evaporation pressure of the external heat exchanger, thus avoiding the chassis of the air conditioner from freezing, and ensuring normal drainage for the chassis during defrosting, thereby improving the stability and reliability of the air conditioner.

Further, according to embodiments of the present disclosure, the control method for a heating system of an air conditioner may include the following additional technical features.

According to some embodiments of the present disclosure, the control method includes: determining an icing level of the air conditioner according to a preset temperature range of the ambient temperature, wherein one preset temperature range corresponds to one icing level, and the higher the icing level is, the longer a turning-on period for the chassis heating device and the shorter a turning-off period for the chassis heating device are.

According to some embodiments of the present disclosure, said controlling a chassis heating device according to the saturation temperature or the evaporation temperature of the external heat exchanger includes: judging whether the ambient temperature, the saturation temperature or the evaporation temperature of the external heat exchanger is higher than a first preset temperature threshold for a time period greater than or equal to a first preset duration; and turning off the chassis heating device, if the ambient temperature is higher than the first preset temperature threshold, or the saturation temperature or the evaporation temperature of the external heat exchanger is higher than the first preset temperature threshold for the time period greater than or equal to the first preset duration.

According to some embodiments of the present disclosure, the control method further includes: judging whether the air conditioner is in a standby state when the ambient temperature, the saturation temperature or the evaporation temperature of the external heat exchanger is lower than or equal to the first preset temperature threshold for a time period greater than or equal to a second preset duration; and controlling the chassis heating device according to a second preset temperature threshold if the air conditioner is not in the standby state, wherein the second preset temperature threshold is lower than the first preset temperature threshold.

According to some embodiments of the present disclosure, controlling the chassis heating device according to a second preset temperature threshold includes: controlling the chassis heating device to keep turning on, if the ambient temperature is higher than the second preset temperature threshold; controlling the chassis heating device to turn on when the air conditioner is in a defrosting mode, and controlling the chassis heating device to turn off after a preset delaying period at the end of the defrosting mode, if the ambient temperature is lower than or equal to the second preset temperature threshold.

According to some embodiments of the present disclosure, controlling the chassis heating device according to a second preset temperature threshold further includes: controlling the chassis heating device to turn on and off regularly if the ambient temperature, the saturation temperature or the evaporation temperature of the external heat exchanger is higher than the second preset temperature threshold; controlling the chassis heating device to turn on when the air conditioner is in the defrosting mode, and controlling the chassis heating device to turn off after a preset delay period at the end of the defrosting mode, if the ambient temperature, the saturation temperature or the evaporation temperature of the external heat exchanger is lower than or equal to the second preset temperature threshold.

According to some embodiments of the present disclosure, a cycle of turning on and off regularly is turning on for a second preset minute at an interval of a first preset minute.

According to some embodiments of the present disclosure, controlling the chassis heating device to turn on and off regularly includes: changing a cycle of turning on and off regularly for the chassis heating device according to the evaporation temperature of the external heat exchanger.

According to some embodiments of the present disclosure, changing a cycle of turning on and off regularly for the chassis heating device according to the evaporation temperature of the external heat exchanger includes: setting a turning-on duration of an intermittent turning-on state for the chassis heating device as a first preset turning-on duration, and setting an interval duration of the intermittent turning-on state for the chassis heating device as a first preset interval duration, if the evaporation temperature of the external heat exchanger is higher than a first preset evaporation temperature threshold and lower than or equal to a second preset evaporation temperature threshold for a third preset duration, wherein the second preset evaporation temperature threshold is higher than the first preset evaporation temperature threshold; setting the turning-on duration of the intermittent turning-on state for the chassis heating device as a second preset turning-on duration, and setting the interval duration of the intermittent turning-on state for the chassis heating device as a second preset interval duration, if the evaporation temperature of the external heat exchanger is higher than the second preset evaporation temperature threshold and lower than or equal to a third preset evaporation temperature threshold for a fourth preset duration, wherein the third preset evaporation temperature threshold is higher than the second preset evaporation temperature threshold, and the first preset turning-on duration is greater than the second preset turning-on duration, and the second preset interval duration is less than the first preset interval duration.

According to some embodiments of the present disclosure, the control method includes: controlling the chassis heating device to turn on and off regularly when the air conditioner system is in the standby state.

According to some embodiments of the present disclosure, a cycle of turning on and off regularly is turning on for a preset minute at an interval of a preset hour.

For the above object, in a second aspect, the present disclosure provides in embodiments a control apparatus for a heating system of an air conditioner, including: an obtaining module, configured to obtain an ambient temperature, a saturation temperature corresponding to an evaporation pressure of an external heat exchanger or an evaporation temperature of the external heat exchanger; and a controlling module, configured to control a chassis heating device according to the ambient temperature, the saturation temperature or the evaporation temperature of the external heat exchanger.

According to embodiments in the present disclosure, the control apparatus for a heating system of an air conditioner obtains an ambient temperature, a saturation temperature corresponding to an evaporation pressure of an external heat exchanger or an evaporation temperature of the external heat exchanger by the obtaining module; and controls a chassis heating device according to the ambient temperature, the saturation temperature or the evaporation temperature of the external heat exchanger by the controlling module, such that the chassis heating device is controlled according to the ambient temperature, the saturation temperature corresponding to the evaporation pressure of the external heat exchanger, or the evaporation temperature of the external heat exchanger, thus avoiding the chassis of the air conditioner from freezing, and ensuring normal drainage for the chassis during defrosting, thereby improving the stability and reliability of the air conditioner.

Further, according to embodiments of the present disclosure, the control apparatus for a heating system of an air conditioner may include the following additional technical features.

According to some embodiments of the present disclosure, the controlling module is further configured to determine an icing level of the air conditioner according to a preset temperature range of the ambient temperature, wherein one preset temperature range corresponds to one icing level, and the higher the icing level is, the longer a turning-on period for the chassis heating device and the shorter a turning-off period for the chassis heating device are.

According to some embodiments of the present disclosure, the control apparatus for a heating system of an air conditioner further includes: a judging module, configured to judge whether the ambient temperature, the saturation temperature or the evaporation temperature of the external heat exchanger is higher than a first preset temperature threshold for a time period greater than or equal to a first preset duration; and the controlling module is further configured to turn off the chassis heating device, when the ambient temperature is higher than the first preset temperature threshold, or the saturation temperature or the evaporation temperature of the external heat exchanger is higher than the first preset temperature threshold for the time period greater than or equal to the first preset duration.

According to some embodiments of the present disclosure, the judging module is further configured to judge whether the air conditioner is in a standby state when the ambient temperature, the saturation temperature or the evaporation temperature of the external heat exchanger is lower than or equal to the first preset temperature threshold for a time period greater than or equal to a second preset duration; and the controlling module is further configured to control the chassis heating device according to a second preset temperature threshold when the air conditioner is not in the standby state, wherein the second preset temperature threshold is lower than the first preset temperature threshold.

According to some embodiments of the present disclosure, the controlling module is further configured to: control the chassis heating device to keep turning on, when the ambient temperature is higher than the second preset temperature threshold; control the chassis heating device to turn on when the air conditioner is in a defrosting mode, and control the chassis heating device to turn off after a preset delaying period at the end of the defrosting mode, when the ambient temperature is lower than or equal to the second preset temperature threshold.

According to some embodiments of the present disclosure, the controlling module is further configured to: control the chassis heating device to turn on and off regularly when the ambient temperature, the saturation temperature or the evaporation temperature of the external heat exchanger is higher than the second preset temperature threshold; control the chassis heating device to turn on when the air conditioner is in the defrosting mode, and control the chassis heating device to turn off after a preset delay period at the end of the defrosting mode, when the ambient temperature, the saturation temperature or the evaporation temperature of the external heat exchanger is lower than or equal to the second preset temperature threshold.

According to some embodiments of the present disclosure, a cycle of turning on and off regularly is turning on for a second preset minute at an interval of a first preset minute.

According to some embodiments of the present disclosure, the controlling module is further configured to change a cycle of turning on and off regularly for the chassis heating device according to the evaporation temperature of the external heat exchanger.

According to some embodiments of the present disclosure, the controlling module is further configured to: set a turning-on duration of an intermittent turning-on state for the chassis heating device as a first preset turning-on duration, and set an interval duration of the intermittent turning-on state for the chassis heating device as a first preset interval duration, when the evaporation temperature of the external heat exchanger is higher than a first preset evaporation temperature threshold and lower than or equal to a second preset evaporation temperature threshold for a third preset duration, wherein the second preset evaporation temperature threshold is higher than the first preset evaporation temperature threshold; set the turning-on duration of the intermittent turning-on state for the chassis heating device as a second preset turning-on duration, and set the interval duration of the intermittent turning-on state for the chassis heating device as a second preset interval duration, when the evaporation temperature of the external heat exchanger is higher than the second preset evaporation temperature threshold and lower than or equal to a third preset evaporation temperature threshold for a fourth preset duration, wherein the third preset evaporation temperature threshold is higher than the second preset evaporation temperature threshold, and the first preset turning-on duration is greater than the second preset turning-on duration, and the second preset interval duration is less than the first preset interval duration.

According to some embodiments of the present disclosure, the controlling module is further configured to control the chassis heating device to turn on and off regularly when the air conditioner system is in the standby state.

According to some embodiments of the present disclosure, a cycle of turning on and off regularly is turning on for a preset minute at an interval of a preset hour.

For the above object, in a third aspect, the present disclosure provides in embodiments an air conditioner, including: a control apparatus for a heating system of an air conditioner as described above and a chassis heating device, wherein the chassis heating device is installed at a unit chassis of the air conditioner, and the chassis heating device is configured to heat the unit chassis under the control of the control apparatus.

According to embodiments of the present disclosure, by using the control apparatus for a heating system of an air conditioner as described above, the air conditioner can control the chassis heating device according to the ambient temperature, the saturation temperature corresponding to the evaporation pressure of the external heat exchanger or the evaporation temperature of the external heat exchanger, thus avoiding the chassis of the air conditioner from freezing, and ensuring normal drainage for the chassis during defrosting, thereby improving the stability and reliability of the air conditioner.

Figure 1:
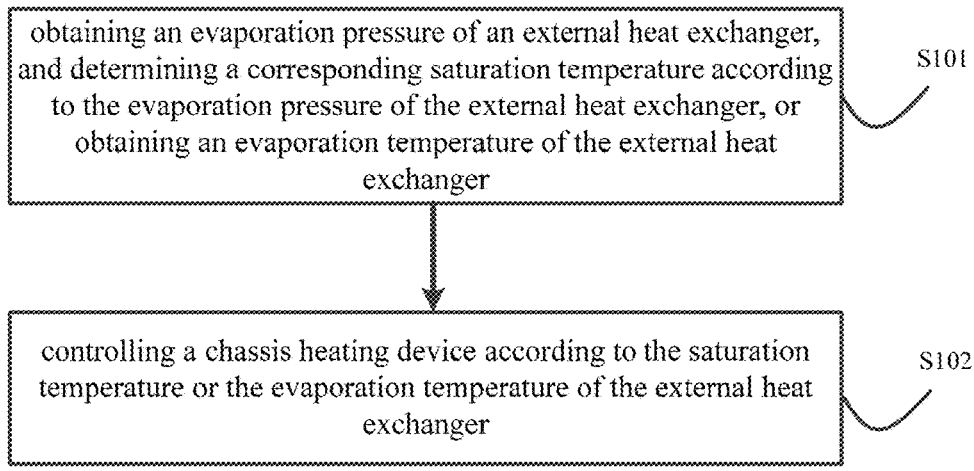
FIG. 1 is a flow chart showing a control method for a heating system of an air conditioner according to some embodiments of the present disclosure.

DRAWING REFERENCES air conditioner 1000
controlling apparatus for heating system of air conditioner 100, obtaining module 1, controlling module 2, judging module 3;
chassis heating device 20, unit chassis 30, fan 40.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The air conditioner, and control method and device for heating system thereof in embodiments of the present disclosure are described below with reference to the drawings.

Embodiment 1

FIG. 1 is a flow chart showing a control method for a heating system of an air conditioner according to some embodiments of the present disclosure.

As shown in FIG. 1, the control method for a heating system of an air conditioner includes S101 and S102.

At S101: an evaporation pressure of an external heat exchanger is obtained, and a corresponding saturation temperature is determined according to the evaporation pressure of the external heat exchanger; or an evaporation temperature of the external heat exchanger is obtained.

Optionally, in some embodiments of the present disclosure, the evaporation pressure PL of the external heat exchanger may be obtained by a pressure sensor arranged between a throttling element and the external heat exchanger or between the external heat exchanger and a compressor, and then the corresponding saturation temperature TP is determined accordingly. Alternatively, the evaporation temperature TL of the external heat exchanger may be obtained by a temperature sensor arranged between the external heat exchanger and a throttling element or between the external heat exchanger and a refrigerant reversing device.

At S102, a chassis heating device is controlled according to the saturation temperature or the evaporation temperature of the external heat exchanger.

That is, the chassis heating device is controlled according to the saturation temperature TP corresponding to the evaporation pressure PL of the external heat exchanger, or the evaporation temperature TL of the external heat exchanger, thus avoiding the chassis of the air conditioner from freezing, and ensuring normal drainage for the chassis during defrosting, thereby improving the stability and reliability of the air conditioner.

Figure 2:
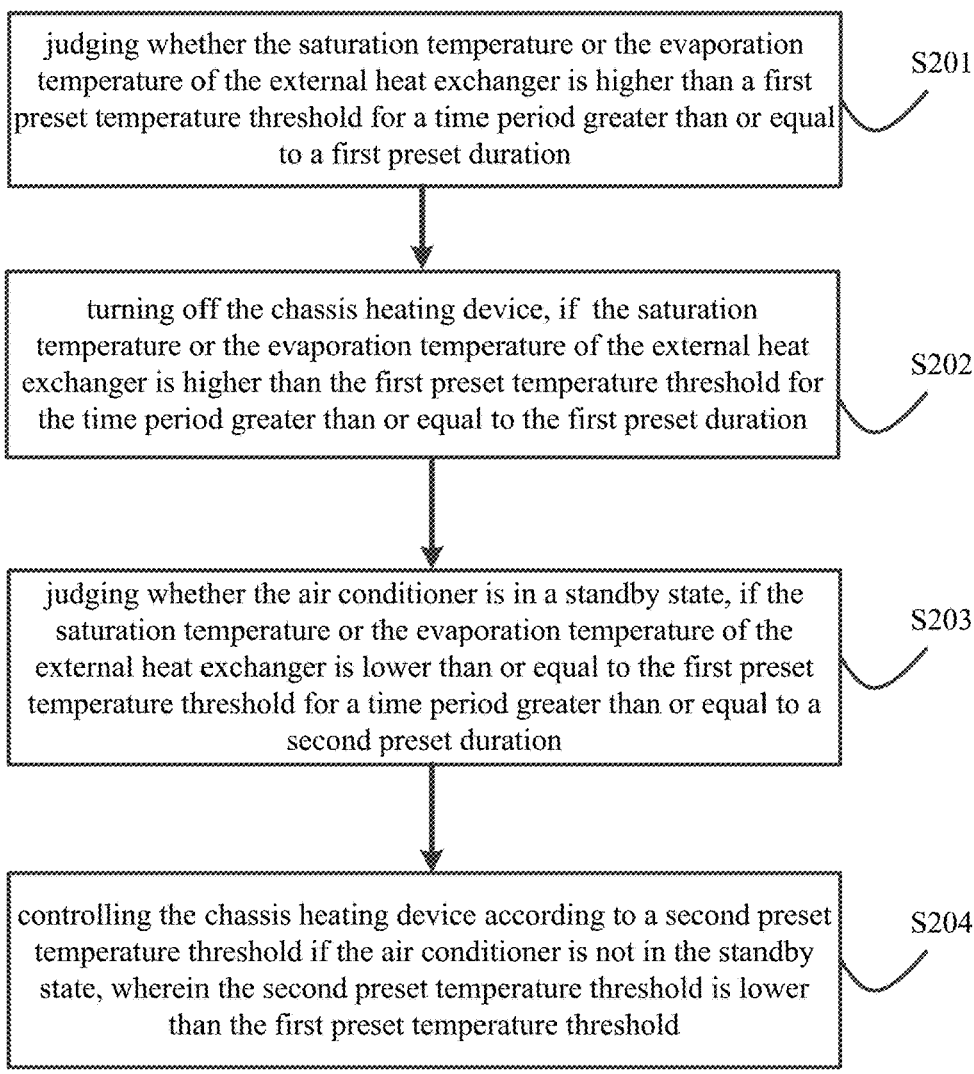
FIG. 2 is a flow chart showing a control method for a heating system of an air conditioner according to some embodiments of the present disclosure.

Further, according to some embodiments of the present disclosure, as shown in FIG. 2, controlling a chassis heating device according to the saturation temperature or the evaporation temperature of the external heat exchanger includes S201 and S202.

At S201, it is judged whether the saturation temperature or the evaporation temperature of the external heat exchanger is higher than a first preset temperature threshold for a time period greater than or equal to a first preset duration.

It would be understood that, when the saturation temperature TP or the evaporation temperature TL of the external heat exchanger is low, a unit chassis of an outdoor unit is prone to freeze; and when the saturation temperature TP or the evaporation temperature TL of the external heat exchanger is low, water generated after defrosting of an air conditioner is prone to freeze at the chassis of the outdoor unit. In some embodiments of the present disclosure however, the first preset temperature threshold T1 can be understood as a cutoff temperature at which the air conditioner is at a temperature within an icing temperature range. It may be considered that the unit chassis is not prone to freeze, when the saturation temperature TP or the evaporation temperature TL of the external heat exchanger is higher than the first preset temperature threshold T1; while it may be considered that the unit chassis is prone to freeze, when the saturation temperature TP or the evaporation temperature TL of the external heat exchanger is lower than or equal to the first preset temperature threshold T1. In some embodiments of the present disclosure, the first preset temperature threshold may preferably be 0° C.

At S202, the chassis heating device is turned off if the saturation temperature or the evaporation temperature of the external heat exchanger is higher than the first preset temperature threshold for the time period greater than or equal to the first preset duration.

The first preset duration t1 is a preset value, and t1≥0.

That is, when the saturation temperature TP or the evaporation temperature TL of the external heat exchanger is higher than the first preset temperature threshold T1 for the time period t which is greater than or equal to the first preset duration t1, the chassis heating device is turned off. In other words, the chassis heating device is turned off when TP>T1 and t≥t1, or TL>T1 and t≥t1.

Further, according to some embodiments of the present disclosure, as shown in FIG. 2, controlling a chassis heating device according to the evaporating pressure of the external heat exchanger or evaporation temperature of the external heat exchanger further includes S203 and S204.

At S203, it is judged whether the air conditioner is in a standby state if the saturation temperature or the evaporation temperature of the external heat exchanger is lower than or equal to the first preset temperature threshold for a time period greater than or equal to a second preset duration.

The second preset duration t2 is a preset value, and t2≥0.

At S204, the chassis heating device is controlled according to a second preset temperature threshold if the air conditioner is not in the standby state, wherein the second preset temperature threshold is lower than the first preset temperature threshold.

The second preset temperature threshold T2 is a preset value, for example, in some embodiments of the present disclosure, the second preset temperature threshold T2 may preferably be −8° C.

Figure 3:
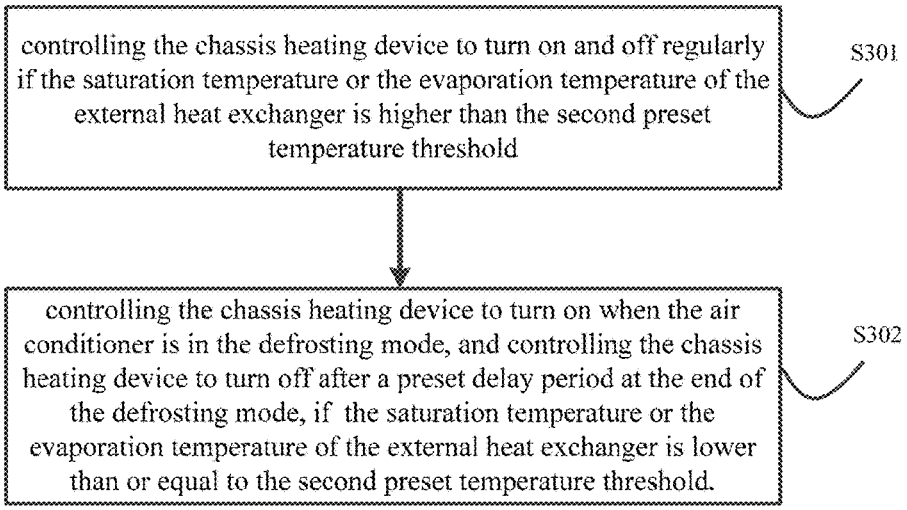
FIG. 3 is another flow chart showing a control method for a heating system of an air conditioner according to some embodiments of the present disclosure.

Further, according to some embodiments of the present disclosure, as shown in FIG. 3, controlling a chassis heating device according to the second preset temperature threshold includes S301 and S302.

At S301, the chassis heating device is controlled to intermittently turn on if the saturation temperature or the evaporation temperature of the external heat exchanger is higher than the second preset temperature threshold.

That is, when the saturation temperature TP or the evaporation temperature TL of the external heat exchanger is higher than the second preset temperature threshold T2, i.e., when TP>T2 or TL>T2, the chassis heating device is controlled to intermittently turn on.

At S302, the chassis heating device is controlled to turn on when the air conditioner is in a defrosting mode, and the chassis heating device is controlled to turn off after a preset delaying period at the end of the defrosting mode, if the saturation temperature or the evaporation temperature of the external heat exchanger is lower than or equal to the second preset temperature threshold.

That is, when the saturation temperature TP or the evaporation temperature TL of the external heat exchanger is lower than or equal to the second preset temperature threshold T2, i.e., when TP≤T2 or TL≤T2, the chassis heating device is controlled to turn on when the air conditioner is in a defrosting mode, and the chassis heating device is controlled to turn off after a first preset delaying period at the end of the defrosting mode.

Further, according to some embodiments of the present disclosure, the chassis heating device is controlled to intermittently turn on if the air conditioner is in a standby state.

That is, when the air conditioner is in a standby state, the chassis heating device is controlled to intermittently turn on.

Figure 4:
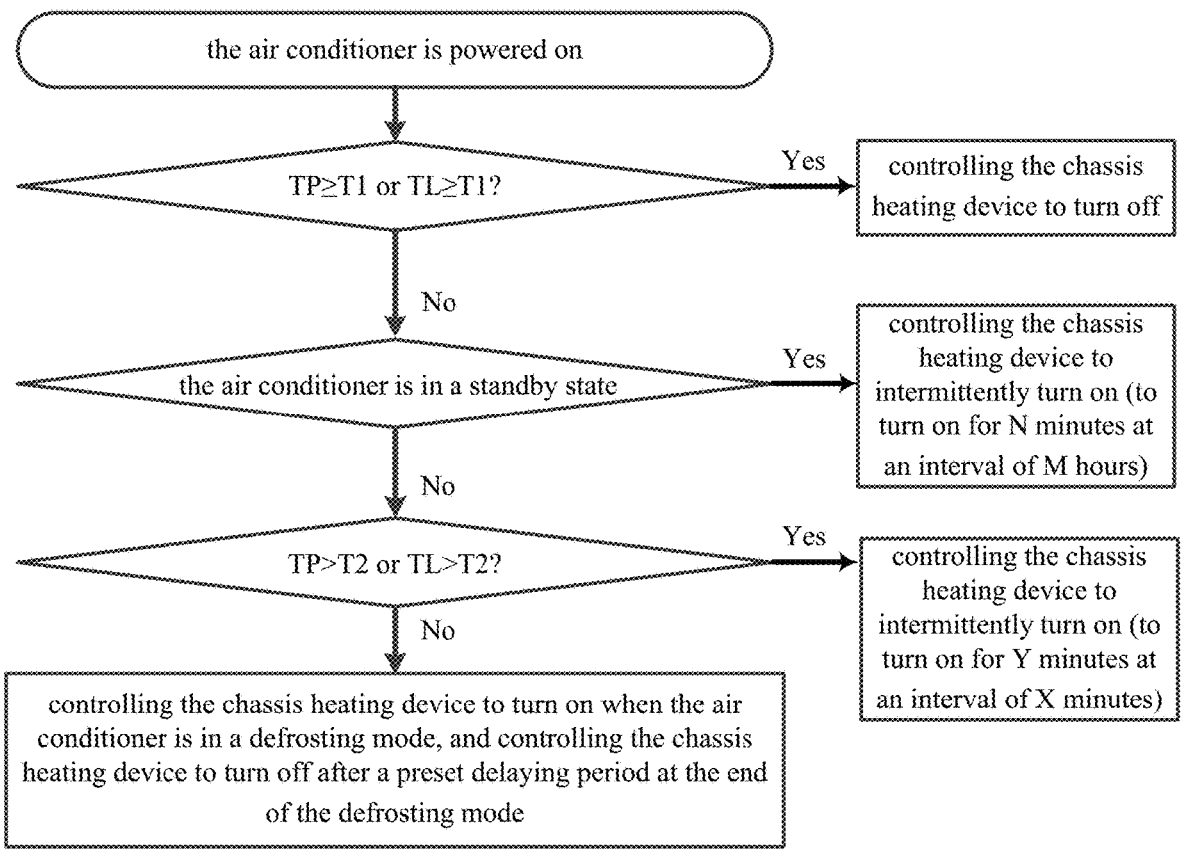
FIG. 4 is still another flow chart showing a control method for a heating system of an air conditioner according to some embodiments of the present disclosure.

Specifically, referring to FIG. 4, according to some embodiments of the present disclosure, once the air conditioner is powered on, the evaporation pressure PL of the external heat exchanger is obtained, and the corresponding saturation temperature TP is determined according to the evaporation pressure PL of the external heat exchanger; or the evaporation temperature TL of the external heat exchanger is obtained, and it is judged whether the saturation temperature TP or the evaporation temperature TL of the external heat exchanger is higher than or equal to the first preset temperature threshold T1. When the saturation temperature TP or the evaporation temperature TL of the external heat exchanger is higher than or equal to the first preset temperature threshold T1, the chassis heating device is turned off. When the saturation temperature TP or the evaporation temperature TL of the external heat exchanger is lower than the first preset temperature threshold T1, it is judged whether the air conditioner is in the standby state. When the air conditioner is in the standby state, the chassis heating device is controlled to intermittently turn on, for example, to turn on for N minutes at an interval of M hours.

Optionally, according to some embodiments of the present disclosure, T1 is 0° C., and M is 2 hours, and N is 30 minutes. T1, M and N may be set according to the actual situation.

When the air conditioner is not in the standby state, it is judged whether the saturation temperature TP or the evaporation temperature TL of the external heat exchanger is higher than a second preset temperature threshold T2. When the saturation temperature TP or the evaporation temperature TL of the external heat exchanger is higher than the second preset temperature threshold T2, the chassis heating device is controlled to intermittently turn on, for example, to turn on for Y minutes at an interval of X minutes. When the saturation temperature TP or the evaporation temperature TL of the external heat exchanger is lower than or equal to the second preset temperature threshold T2, the chassis heating device is controlled to turn on when the air conditioner is in a defrosting mode, and the chassis heating device is controlled to turn off after a first preset delaying period, for example, after T minutes, at the end of the defrosting mode.

Optionally, according to some embodiments of the present disclosure, T is 30 minutes.

It should be noted that when the saturation temperature TP or the evaporation temperature TL of the external heat exchanger is lower than or equal to the second preset temperature threshold T2, when the air conditioner is not turned on in the defrosting mode, the chassis heating device does not need to be turned on at this moment. In some embodiments, the chassis heating device is turned on at the moment when the air conditioner is turned on in the defrosting mode.

Further, at the end of the defrosting mode, the chassis heating device is controlled to turn off after a preset delay period, wherein the preset delay period is associated with an icing level of the air conditioner, and the higher the icing level is, the longer the preset delay period is.

Figure 5:
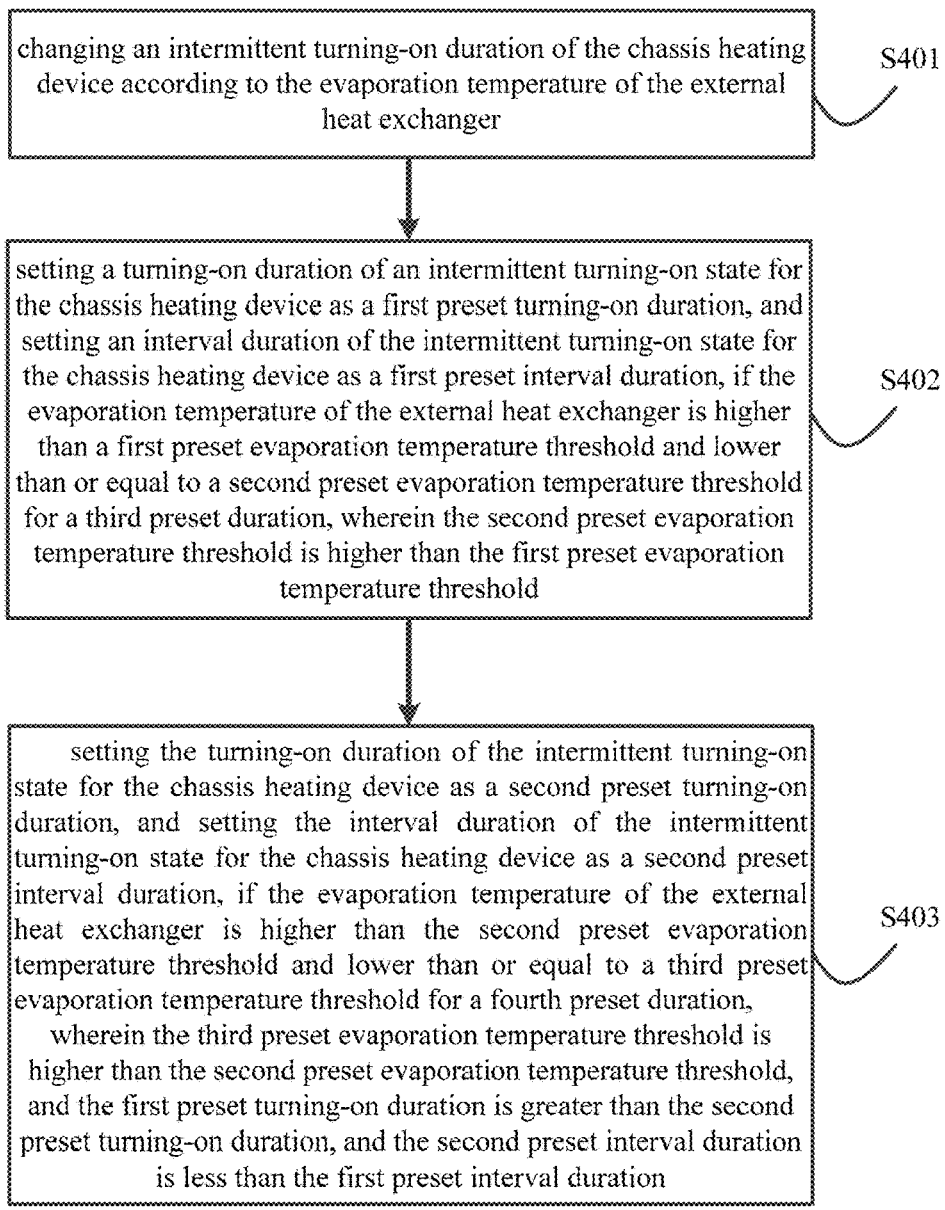
FIG. 5 is a flow chart showing a method for controlling a cycle of turning on and off regularly for a chassis heating device according to some embodiments of the present disclosure.

Further, according to some embodiments of the present disclosure, as shown in FIG. 5, controlling the chassis heating device to intermittently turn on includes S401.

At S401, an intermittent turning-on duration of the chassis heating device is changed according to the evaporation temperature of the external heat exchanger.

In some embodiments of the present disclosure, in the case that the saturation temperature TP or the evaporation temperature TL of the external heat exchanger is lower than or equal to the first preset temperature threshold T1, the evaporation temperature TL of the external heat exchanger is divided into several temperature ranges, where different preset ambient temperature ranges correspond to one icing level, and the preset ambient temperature range can be understood as a temperature range within which the air conditioner is at a temperature within an icing-prone temperature range. That is, when the evaporation temperature TL of the external heat exchanger is at a temperature within the preset temperature range, the icing-prone temperature range corresponds to one icing level.

Specifically, according to some embodiments of the present disclosure, as shown in FIG. 5, changing an intermittent turning-on duration of the chassis heating device according to the evaporation temperature of the external heat exchanger further includes S402 and S403.

At S402, a turning-on duration of an intermittent turning-on state for the chassis heating device is set as a first preset turning-on duration, and an interval duration of the intermittent turning-on state for the chassis heating device is set as a first preset interval duration, if the evaporation temperature of the external heat exchanger is higher than a first preset evaporation temperature threshold and lower than or equal to a second preset evaporation temperature threshold for a third preset duration, wherein the second preset evaporation temperature threshold is higher than the first preset evaporation temperature threshold.

That is, when the evaporation temperature TL of the external heat exchanger is higher than the first preset evaporation temperature threshold TP1 and lower than or equal to the second preset evaporation temperature threshold TP2 for the third preset duration t3, i.e., TP1<TP≤TP2 for t3, the turning-on duration of an intermittent turning-on state for the chassis heating device is set as the first preset turning-on duration tk1, and the interval duration of the intermittent turning-on state for the chassis heating device is set as the first preset interval duration tj1.

At S403, the turning-on duration of the intermittent turning-on state for the chassis heating device is set as a second preset turning-on duration, and the interval duration of the intermittent turning-on state for the chassis heating device is set as a second preset interval duration, if the evaporation temperature of the external heat exchanger is higher than the second preset evaporation temperature threshold and lower than or equal to a third preset evaporation temperature threshold for a fourth preset duration, wherein the third preset evaporation temperature threshold is higher than the second preset evaporation temperature threshold, and the first preset turning-on duration is greater than the second preset turning-on duration, and the second preset interval duration is less than the first preset interval duration.

That is, when the evaporation temperature TL of the external heat exchanger is higher than the second preset evaporation temperature threshold TP2 and lower than or equal to the third preset evaporation temperature threshold TP3 for the fourth preset duration t4, i.e., TP2<TP≤TP3 for t4, the turning-on duration of the intermittent turning-on state for the chassis heating device is set as the second preset turning-on duration tk2, and the interval duration of the intermittent turning-on state for the chassis heating device is set as the second preset interval duration tj2, wherein tk2>tk1, tj1<tj2. In some embodiments, tk2<tk1, and tj2<tj1.

For example, in some examples of the present disclosure, when the air conditioner is in an operating state and the saturation temperature TP or the evaporation temperature TL of the external heat exchanger is lower than or equal to the first preset temperature threshold T1, the icing temperature ranges may be further classified into different levels according to the evaporation temperature TL of the external heat exchanger. When the evaporation temperature TL of the external heat exchanger is at a temperature within the preset temperature range of $Ai+1<TL<Ai$ and the ambient temperature maintains at such a preset temperature range for N minutes (where $A1=A$, and $Ai+1≤Ai$, and $i≥1$, and A represents the first preset temperature threshold), it may determine that the air conditioner is at a temperature within a level i icing-prone temperature range at this moment. When $i=1$ and $A2<TL≤A1$, the air conditioner is at a temperature within a level 1 icing-prone temperature range. When $i=2$ and $A3<TL≤A2$, the air conditioner is at a temperature within a level 2 icing-prone temperature range. When $i=3$ and $A4<TL≤A3$, the air conditioner is at a temperature within a level 3 icing-prone temperature range. The same is true for analogs.

It should be noted that the icing level of the level 1 icing-prone temperature range is greater than that of the level 2 icing-prone temperature range, and the icing level of the level 2 icing-prone temperature range is greater than that of the level 3 icing-prone temperature range.

That is, when the air conditioner is at a temperature within the level 1 icing-prone temperature range, the turning-on duration of the intermittent turning-on state for the chassis heating device is set as the first preset turning-on duration tk1, which is longer than the second preset turning-on duration tk2 when the air conditioner is at a temperature within the level 2 icing-prone temperature range, and the interval duration of the intermittent turning-on state for the chassis heating device is set as the first preset interval duration tj1, which is less than the second preset interval duration tj2 when the air conditioner is in a level 2 icing-prone area, and so on, i.e., $tki>tki+1$, and $tji≤tji+1$.

In summary, according to embodiments in the present disclosure, the control method for a heating system of an air conditioner obtains an evaporation pressure of an external heat exchanger, and determines a corresponding saturation temperature according to the evaporation pressure of the external heat exchanger or obtains an evaporation temperature of the external heat exchanger; and controls a chassis heating device according to the saturation temperature or the evaporation temperature of the external heat exchanger, such that the chassis heating device is controlled according to the saturation temperature corresponding to the evaporation pressure of the external heat exchanger or the evaporation temperature of the external heat exchanger, thus avoiding the chassis of the air conditioner from freezing, and ensuring normal drainage for the chassis during defrosting, thereby improving the stability and reliability of the air conditioner.

Figure 6:
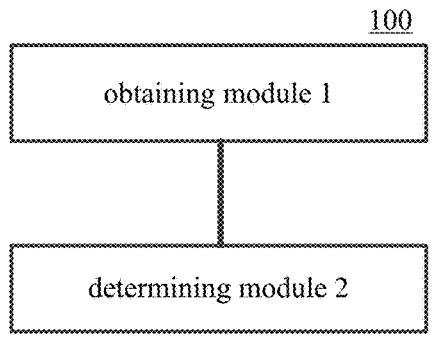
FIG. 6 is a block diagram showing a control apparatus for a heating system of an air conditioner in some embodiments of the present disclosure.

FIG. 6 is a block diagram showing a control apparatus for a heating system of an air conditioner in some embodiments of the present disclosure. As shown in FIG. 6, the control apparatus 100 for a heating system of an air conditioner includes: an obtaining module 1 and a controlling module 2.

The obtaining module 1 is configured to obtain a saturation temperature corresponding to an evaporation pressure of an external heat exchanger or an evaporation temperature of the external heat exchanger. The controlling module 2 is configured to control a chassis heating device according to the saturation temperature or the evaporation temperature of the external heat exchanger.

Further, according to some embodiments of the present disclosure, the controlling module 2 is further configured to turn off the chassis heating device, when the saturation temperature or the evaporation temperature of the external heat exchanger is higher than a first preset temperature threshold for a time period greater than or equal to a first preset duration.

Further, according to some embodiments of the present disclosure, the controlling module 2 is further configured to: judge whether the air conditioner is in a standby state when the saturation temperature or the evaporation temperature of the external heat exchanger is lower than or equal to the first preset temperature threshold for a time period greater than or equal to a second preset duration; and control the chassis heating device according to a second preset temperature threshold when the air conditioner is not in the standby state, wherein the second preset temperature threshold is lower than the first preset temperature threshold.

Further, according to some embodiments of the present disclosure, the controlling module 2 is further configured to: control the chassis heating device to intermittently turn on, when the saturation temperature or the evaporation temperature of the external heat exchanger is higher than the second preset temperature threshold; control the chassis heating device to turn on when the air conditioner is in a defrosting mode, and control the chassis heating device to turn off after a preset delaying period at the end of the defrosting mode, when the saturation temperature or the evaporation temperature of the external heat exchanger is lower than or equal to the second preset temperature threshold.

Further, according to some embodiments of the present disclosure, the controlling module 2 is further configured to control the chassis heating device to intermittently turn on, if the air conditioner is in the standby state.

Further, according to some embodiments of the present disclosure, the controlling module 2 is further configured to change the intermittent turning-on duration of the chassis heating device according to the evaporation temperature of the external heat exchanger.

Further, according to some embodiments of the present disclosure, the controlling module 2 is further configured to: set a turning-on duration of an intermittent turning-on state for the chassis heating device as a first preset turning-on duration, and set an interval duration of the intermittent turning-on state for the chassis heating device as a first preset interval duration, when the evaporation temperature of the external heat exchanger is higher than a first preset evaporation temperature threshold and lower than or equal to a second preset evaporation temperature threshold for a third preset duration, wherein the second preset evaporation temperature threshold is higher than the first preset evaporation temperature threshold; set the turning-on duration of the intermittent turning-on state for the chassis heating device as a second preset turning-on duration, and set the interval duration of the intermittent turning-on state for the chassis heating device as a second preset interval duration, when the evaporation temperature of the external heat exchanger is higher than the second preset evaporation temperature threshold and lower than or equal to a third preset evaporation temperature threshold for a fourth preset duration, wherein the third preset evaporation temperature threshold is higher than the second preset evaporation temperature threshold, and the first preset turning-on duration is greater than the second preset turning-on duration, and the second preset interval duration is less than the first preset interval duration.

It should be noted that the heating system of the air conditioner provided in embodiments of the present disclosure corresponds to the heating device of the air conditioner in embodiments of the present disclosure as described above, and will not be repeated here.

In summary, according to embodiments of the present disclosure, the control apparatus for a heating system of an air conditioner obtains a saturation temperature corresponding to an evaporation pressure of an external heat exchanger or an evaporation temperature of the external heat exchanger by an obtaining module, and controls a chassis heating device according to the saturation temperature or the evaporation temperature of the external heat exchanger by a controlling module, such that the chassis heating device is controlled according to the saturation temperature corresponding to the evaporation pressure of the external heat exchanger or the evaporation temperature of the external heat exchanger, thus avoiding the chassis of the air conditioner from freezing, and ensuring normal drainage for the chassis during defrosting, thereby improving the stability and reliability of the air conditioner.

Embodiment 2

Figure 7:
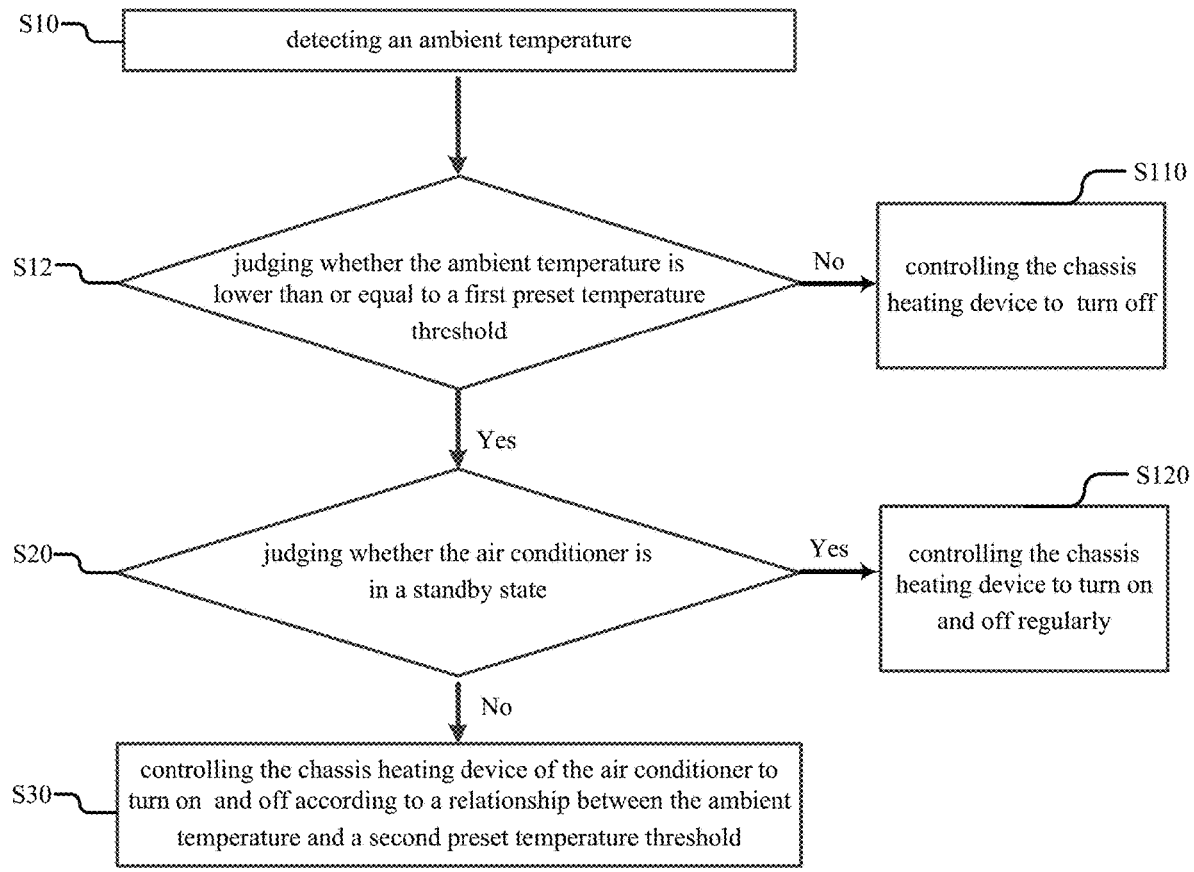
FIG. 7 is a flow chart showing a control method for a heating system in some embodiments of the present disclosure.
Figure 8:
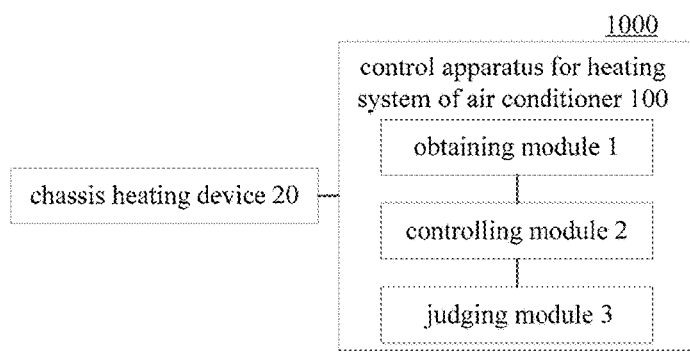
FIG. 8 is a module diagram showing an air conditioner in some embodiments of the present disclosure.
Figure 9:
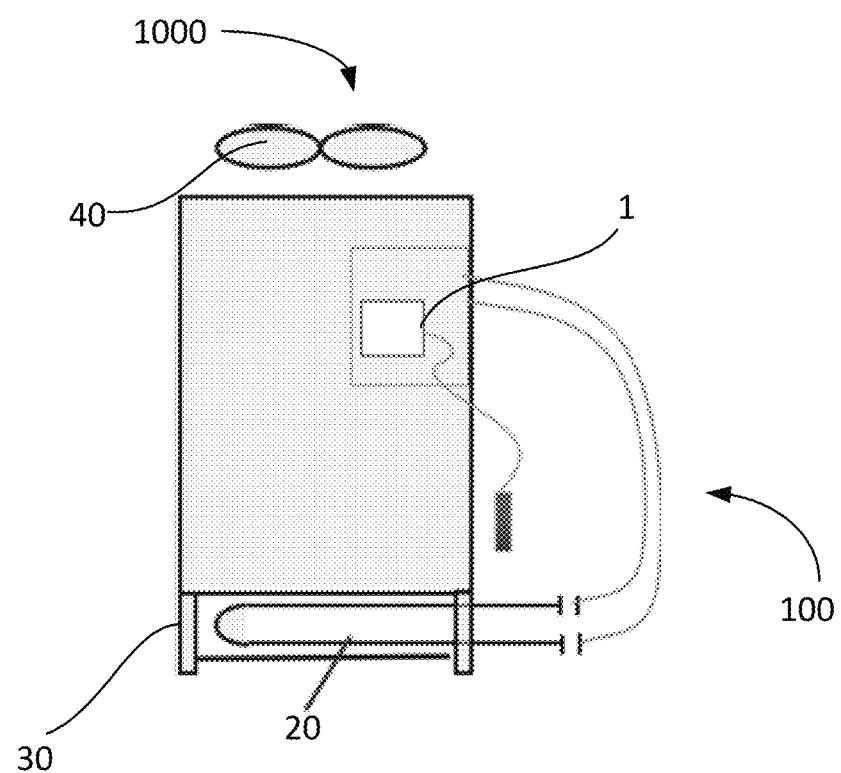
FIG. 9 is a schematic view showing an air conditioner in some embodiments of the present disclosure.

Referring to FIGS. 7 to 9, the present disclosure provides in embodiments a control method for a heating system. In embodiments of the present disclosure, the control method for a heating system is used in an air conditioner 1000. In some embodiments of the present disclosure, the control method for a heating system includes steps S10, S12, S20 and S30.

At the step S10, an ambient temperature is detected.

At the step S12, it is judged that whether the ambient temperature is lower than or equal to a first preset temperature threshold.

At the step S20, it is judged that whether the air conditioner 1000 is in a standby state when the ambient temperature is lower than or equal to the first preset temperature threshold.

At the step S30, when the air conditioner 1000 is not in the standby state, a chassis heating device 20 of the air conditioner 1000 is controlled to turn on and off according to a relationship between the ambient temperature and a second preset temperature threshold.

The control method for a heating system in some embodiments of the present disclosure may be implemented by the control apparatus 100 for a heating system in some embodiments of the present disclosure. The control apparatus 100 for a heating system includes an obtaining module 1, a judging module 3 and a controlling module 2. The step S10 may be implemented by the obtaining module 1. The step S12 and the step S20 may be implemented by the judging module 3. The step S30 may be implemented by the controlling module 2. That is, the obtaining module 1 is configured to detect the ambient temperature. The judging module 3 is configured to judge whether the ambient temperature is lower than or equal to the first preset temperature threshold. When the ambient temperature is lower than or equal to the first preset temperature threshold, the judging module 3 is configured to judge whether the air conditioner 1000 is in a standby state. When the air conditioner 1000 is not in the standby state, the controlling module 2 is configured to control a chassis heating device 20 of the air conditioner 1000 to turn on and off according to a relationship between the ambient temperature and a second preset temperature threshold. The second preset temperature threshold is lower than the first preset temperature threshold.

In the control method for a heating system and the control apparatus 100 for a heating system in the above embodiments, when the air conditioner 1000 is not in the standby state, the chassis heating device 20 of the air conditioner 1000 can be controlled to turn on and off according to the relationship between the ambient temperature and the second preset temperature threshold, so that the unit chassis 30 of the air conditioner 1000 can be controlled to turn on the heating device rapidly, thus avoiding the unit chassis 30 of the air conditioner 1000 from freezing, ensuring unhindered drainage at the unit chassis 30 when defrosting, and saving electricity, thereby improving the using effect and operation reliability of the air conditioner 1000.

Specifically, the control apparatus 100 for a heating system in embodiments of the present disclosure may be a controller, a processor, a control board, or a computer board or a main control board of the air conditioner 1000.

In certain embodiments of the present disclosure, the obtaining module 1 may include a temperature sensor, which may be installed at an outdoor unit of the air conditioner 1000 or other places outdoors that should not be too far away from the outdoor unit. The outdoor unit further includes a compressor and a fan 40, and the unit chassis 30 is located below the compressor, and the fan 40 is located above the compressor. The air conditioner further includes an indoor unit. The obtaining module 1 is configured to detect the ambient temperature outside. The obtaining module 1 is connected to the controlling module 2. The ambient temperature detected by the obtaining module 1 may be transmitted to the controlling module 2 in a wire or wireless manner.

In certain embodiments of the present disclosure, the chassis heating device 20 may include an electric heating tube and/or a resistance wire, which may generate heat to melt the ice at the unit chassis 30 in time, or to avoid the unit chassis 30 from freezing. In some embodiments, the electric heating tube is connected to the controlling module 2 through a wire.

Specifically, when the ambient temperature is low, the unit chassis 30 of the outdoor unit is prone to freeze; and when the ambient temperature is low, water generated after defrosting the air conditioner 1000 is prone to freeze at the chassis of the outdoor unit. In embodiments of the present disclosure however, the first preset temperature threshold can be understood as a cutoff temperature at which the air conditioner 1000 is at a temperature within an icing temperature range. When the ambient temperature is higher than the first preset temperature threshold, the outdoor unit is not prone to freeze. When the ambient temperature is lower than or equal to the first preset temperature threshold, it indicates that the unit chassis 30 is at a temperature within the icing temperature range at this moment, that is, the unit chassis 30 is prone to freeze at this moment.

Therefore, in the some embodiments of the present disclosure, when the ambient temperature is lower than or equal to the first preset temperature threshold, the judging module 3 begins to judge whether the air conditioner 1000 is in the standby state; when the air conditioner 1000 is not in the standby state, the chassis heating device 20 of the air conditioner 1000 is controlled to turn on and off according to the relationship between the ambient temperature and the second preset temperature threshold. It should be noted that the air conditioner 1000 being not in the standby state can be understood as follows: in some embodiments of the present disclosure, the air conditioner 1000 is in a heating mode, when the air conditioner 1000 is in a heating mode, the outdoor unit is prone to freeze due to the lower evaporation temperature. According to embodiments of the present disclosure, when the air conditioner 1000 is not in the standby state, a chassis heating device 20 of the air conditioner 1000 is controlled to turn on and off, thereby avoiding the outdoor unit from freezing.

It should be noted that as collected data of the ambient temperature fluctuates sometimes, when the ambient temperature is lower than or equal to the first preset temperature threshold, judging whether the air conditioner 1000 is in a standby state can be understood as judging whether the air conditioner 1000 is in a standby state until the ambient temperature is lower than or equal to the first preset temperature threshold for a preset duration. In an example, the preset duration may be 10 minutes. The preset duration may be set according to the actual situation.

Referring to FIGS. 7 and 8, in certain embodiments of the present disclosure, the control method includes a step S110:

At the step S110, the chassis heating device 20 is controlled to turn off when an ambient temperature is higher than a first preset temperature threshold.

The above control method may be implemented by the control apparatus 100 in embodiments of the present disclosure. The step S110 is implemented by the controlling module 2. That is, when the ambient temperature is higher than the first preset temperature threshold, the controlling module 2 is configured to control the chassis heating device 20 to turn off. As such, this allows for saving electric energy.

In certain embodiments of the present disclosure, the control method includes: determining an icing level of the air conditioner 1000 according to a preset temperature range of the ambient temperature. The above control method may be implemented by the controlling module 2. The controlling module 2 is configured to determine an icing level of the air conditioner 1000 according to a preset temperature range within which the ambient temperature is. One preset temperature range corresponds to one icing level, and the higher the icing level is, the longer a turning-on period for the chassis heating device 20 and the shorter a turning-off period for the chassis heating device 20 are.

As such, this can allow for controlling the turning-on period and the turning-off period for the chassis heating device 20 accurately according to, thus avoiding the unit chassis 30 from freezing in time.

Specifically, in view of the above analysis, when the ambient temperature is lower than or equal to the first preset temperature threshold, it indicates that the outdoor unit is at a temperature within the icing temperature range, that is, the outdoor unit is prone to freeze at this moment. In some embodiments of the present disclosure, in the case that the ambient temperature is lower than or equal to the first preset temperature threshold, the ambient temperature is divided into several temperature ranges, where different preset ambient temperature ranges correspond to one icing level, and the preset ambient temperature range can be understood as a temperature range within which the air conditioner 1000 is in an icing-prone temperature range. That is, when the ambient temperature is at a temperature within the preset temperature range, the icing-prone temperature range corresponds to an icing level.

In some embodiments, when the air conditioner 1000 is in an operating state, and when the ambient temperature is lower than or equal to the first preset temperature threshold, the icing temperature ranges may be further classified into different levels. The ambient temperature is represented by T4, when the ambient temperature is in the preset temperature range of $Ai+1<T4 \leq Ai$ and the ambient temperature maintains at such a present temperature range for L minute (where $A1=A$, and $Ai+1 \leq Ai$, and $i \geq 1$; and A represents the first preset temperature threshold), it may determine that the air conditioner 1000 is at a temperature within a level i icing-prone temperature range at this moment. When $i=1$ and $A2<T4 \leq A1$, the air conditioner 1000 is at a temperature within a level 1 icing-prone temperature range. When $i=2$ and $A3<T4 \leq A2$, the air conditioner 1000 is at a temperature within a level 2 icing-prone temperature range. When $i=3$ and $A4<T4 \leq A3$, the air conditioner 1000 is in a level 3 icing-prone temperature range. The same is true for analogs. It should be noted that the icing level of the level 1 icing-prone temperature range is greater than that of the level 2 icing-prone temperature range, and the icing level of the level 2 icing-prone temperature range is greater than that of the level 3 icing-prone temperature range. That is, the turning-on duration X1 for the chassis heating device 20 when the air conditioner 1000 is at a temperature within the level 1 icing-prone temperature range is longer than the turning-on duration X2 for the chassis heating device 20 when the air conditioner 1000 is at a temperature within the level 2 icing-prone temperature range. The turning-off duration Y1 for the chassis heating device 20 when the air conditioner 1000 is at a temperature within the level 1 icing-prone temperature range is shorter than or equal to the turning-off duration Y2 for the chassis heating device 20 when the air conditioner 1000 is at a temperature within the level 2 icing-prone temperature range. The same is true for analogs, that is, $Xi>Xi+1$ and $Yi \leq Yi+1$.

Referring to FIGS. 7 and 8, in certain embodiments of the present disclosure, the control method includes a step S120.

At the step S120, when the air conditioner system is in the standby state, the chassis heating device 20 is controlled to turn on and off regularly.

The above control method may be implemented by the control apparatus 100 for a heating system in embodiments of the present disclosure. The step S120 is implemented by the controlling module 2. That is, when the air conditioner system is in the standby state, the controlling module 2 is configured to control the chassis heating device 20 to turn on and off regularly.

As such, this allows that the unit chassis 30 is not prone to freeze when the ambient temperature is low.

In certain embodiments of the present disclosure, at the step S120, a cycle of turning on and off regularly is turning on for a preset minute at an interval of a preset hour. As such, this can avoid the unit chassis 30 from freezing and achieving effect of saving electric energy at the same time. The range of the preset hour is 0.5 to 3 hours, and the range of the preset minute is 5 to 60 minutes.

In some embodiments, when the ambient temperature is lower than or equal to the first preset temperature threshold, and when the air conditioner 1000 is in the standby state, the chassis heating device 20 may be controlled to turn on for N minutes at an interval of M hours. In some embodiments, M is 2 hours and N is 30 minutes. M and N may be set according to the actual situation.

Figure 10:
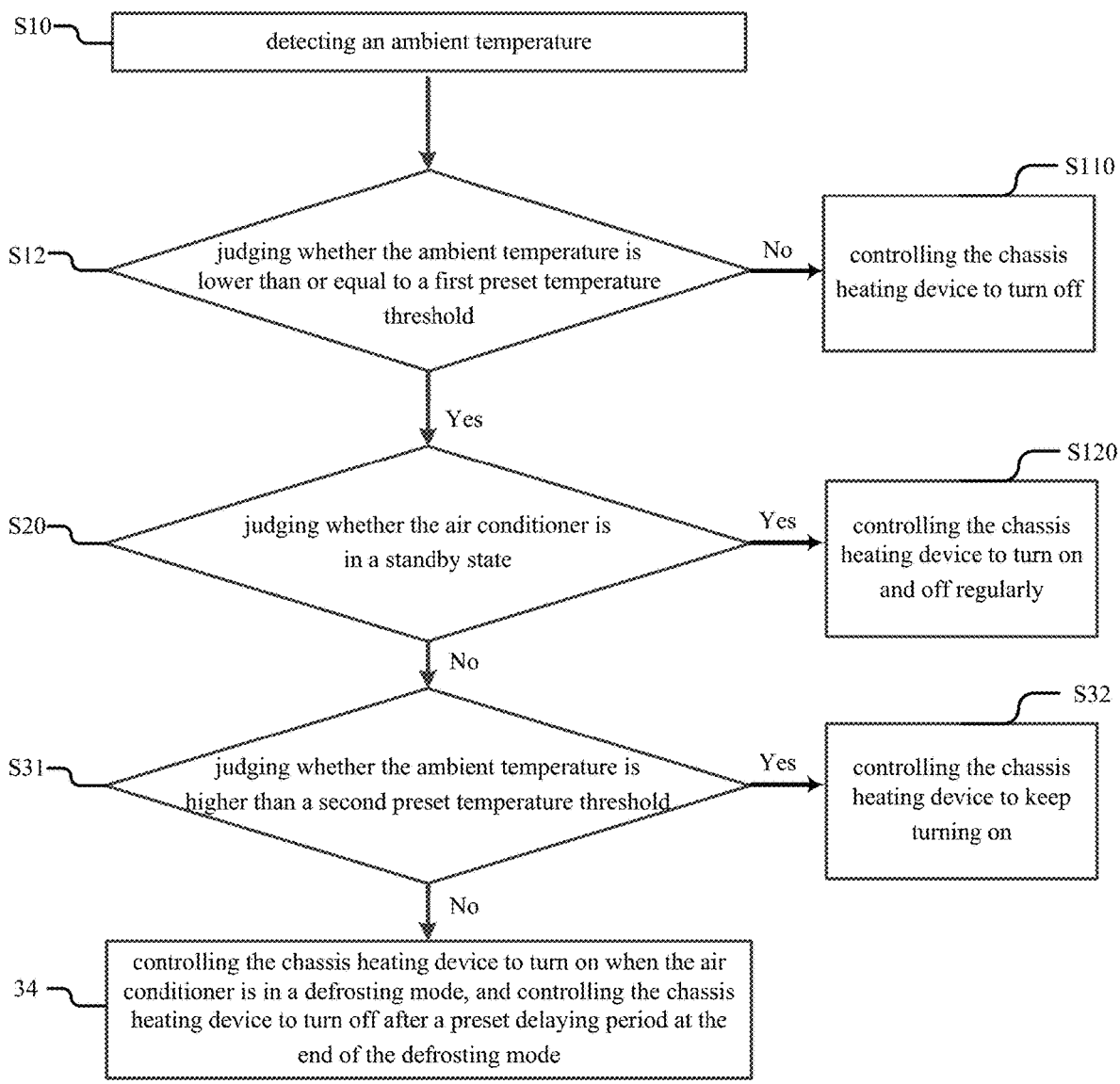
FIG. 10 is another flow chart showing a control method for a heating system of an air conditioner some embodiments of the present disclosure.

Referring to FIG. 10, in certain embodiments of the present disclosure, a step S30 includes steps S31, S32 and S34.

At the step S31, it is judged whether an ambient temperature is higher than a second preset temperature threshold.

At the step S32, when the ambient temperature is higher than the second preset temperature threshold, the chassis heating device 20 is controlled to keep turning on.

At the step S34, when the ambient temperature is not higher than the second preset temperature threshold, the chassis heating device 20 is controlled to turn on when the air conditioner 1000 is in a defrosting mode, and the chassis heating device 20 is controlled to turn off after a preset delaying period at the end of the defrosting mode.

The above control method in some embodiments of the present disclosure may be implemented by the control apparatus 100 in embodiments of the present disclosure. The step S31 may be implemented by the judging module 3. The step S32 and the step S34 may be implemented by the controlling module 2. That is, the judging module 3 is configured to judge whether the ambient temperature is higher than the second preset temperature threshold. When the ambient temperature is higher than the second preset temperature threshold, the controlling module 2 is configured to control the chassis heating device 20 to keep turning on. When the ambient temperature is not higher than the second preset temperature threshold, the controlling module 2 is configured to control the chassis heating device 20 to turn on when the air conditioner 1000 is in a defrosting mode, and the controlling module 2 is configured to control the chassis heating device 20 to turn off after a preset delaying period at the end of the defrosting mode.

As such, this allows the heating device to be turned on rapidly when freezing occurs at the unit chassis 30 of the air conditioner 1000, thus avoiding the unit chassis 30 of the air conditioner 1000 from freezing, and ensuring unhindered drainage at the unit chassis 30 when defrosting.

Figure 11:
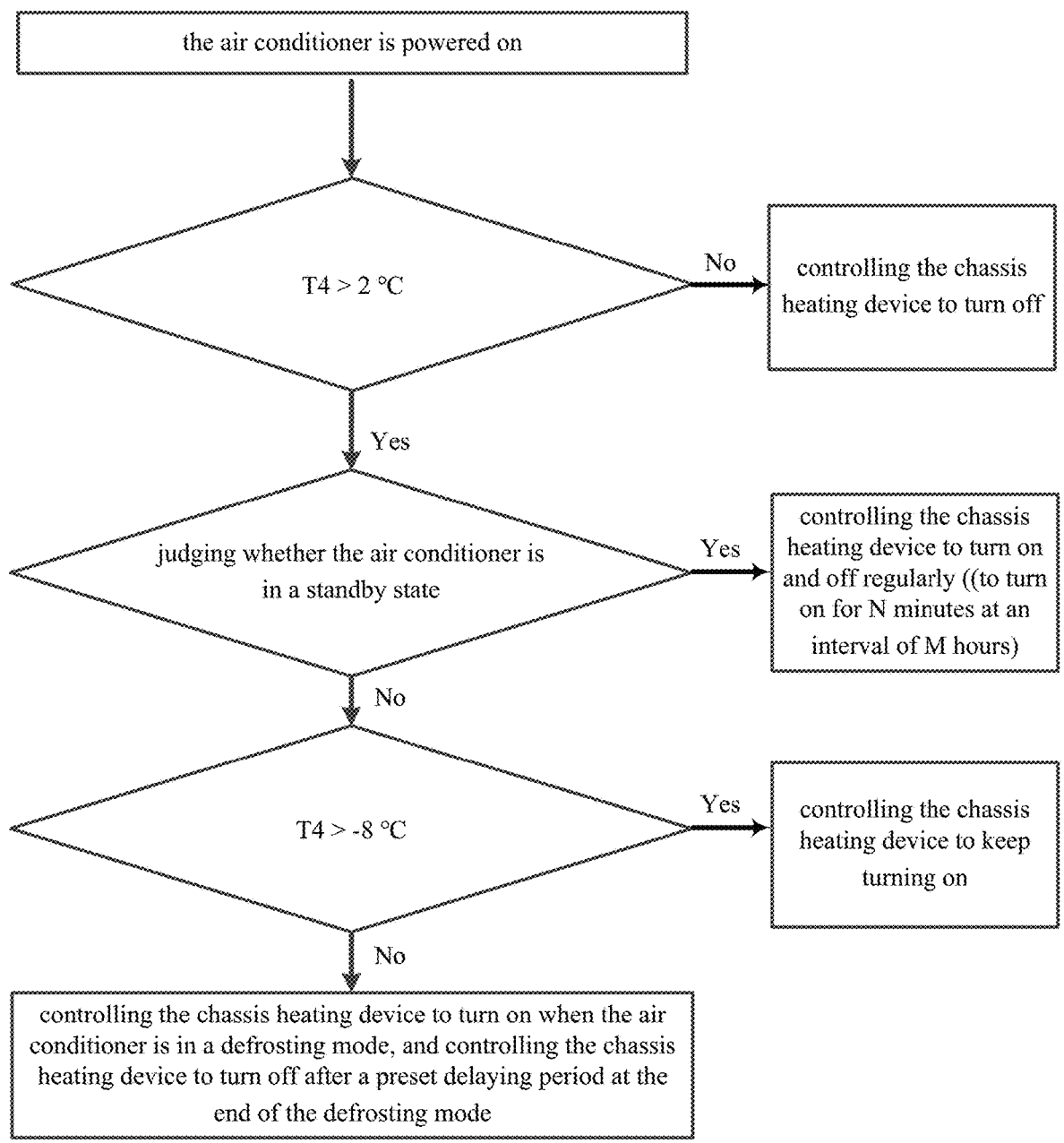
FIG. 11 is still another flow chart showing a control method for a heating system of an air conditioner in some embodiments of the present disclosure.

Specifically, referring to FIG. 11, in some embodiments, the first preset temperature threshold is 2° C., and the second preset temperature threshold is −8° C. It should be noted that, when the ambient temperature is between −8° C. to 2° C., the air conditioner 1000 is at a temperature within a highly icing-prone temperature range. Once the air conditioner 1000 is powered on, the obtaining module 1 begins to detect the ambient temperature, and the judging module 3 judges whether the ambient temperature is higher than 2° C. When the ambient temperature is higher than 2° C., the chassis heating device 20 is not turned on. When the ambient temperature is lower than or equal to 2° C., it is judged whether the air conditioner 1000 is in the standby state. When the air conditioner 1000 is in the standby state, the chassis heating device 20 is controlled to turn on and off regularly, for example, to turn on for N minutes at an interval of M hours. In some embodiments, M is 2 hours and N is 30 minutes. M and N may be set according to the actual situation.

When the air conditioner 1000 is not in the standby state, it is further judged whether the ambient temperature is higher than −8° C. When the ambient temperature is higher than −8° C., the chassis heating device 20 is controlled to keep turning on, that is continuing heating to avoid the unit chassis 30 from freezing. When the ambient temperature is lower than or equal to −8° C., the chassis heating device 20 is controlled to turn on when the air conditioner 1000 is in the defrosting mode, and the chassis heating device 20 is controlled to turn off after a preset delaying period, for example, after T minutes, at the end of the defrosting mode. In some embodiments, T is 30 minutes. It should be noted that when the ambient temperature is lower than or equal to −8° C., when the air conditioner 1000 is not turned on in the defrosting mode, the chassis heating device 20 does not need to be turned on at this moment.

Figure 12:
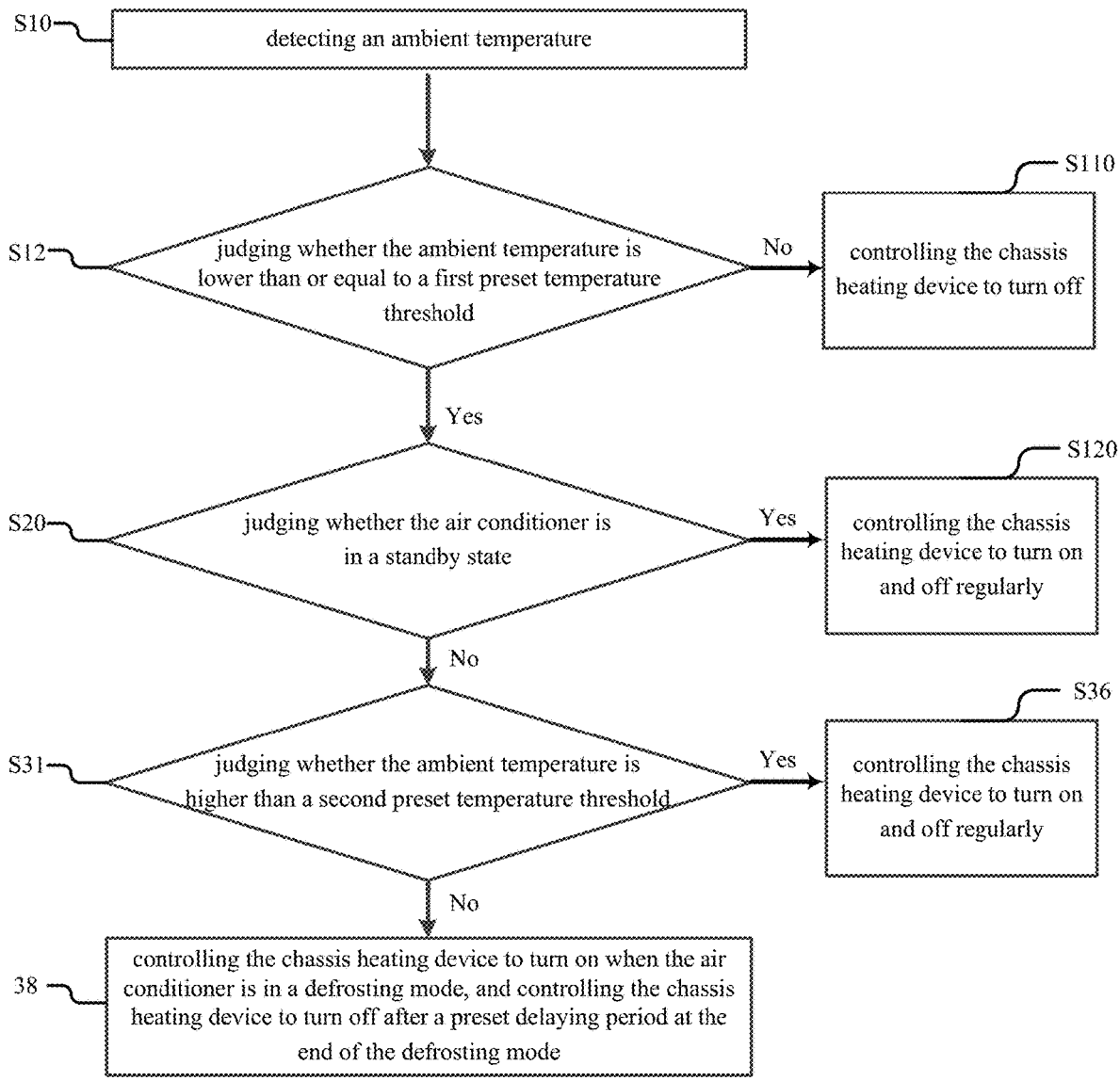
FIG. 12 is yet another flow chart showing a control method for a heating system of an air conditioner in some embodiments of the present disclosure.

Referring to FIGS. 8 and 12, in certain embodiments of the present disclosure, the step S30 includes steps S36 and S38:

At the step S36, when the ambient temperature is higher than the second preset temperature threshold the chassis heating device 20 is controlled to turn on and off regularly.

At the step S38, when the ambient temperature is not higher than the second preset temperature threshold, the chassis heating device 20 is controlled to turn on when the air conditioner 1000 is in the defrosting mode, and the chassis heating device 20 is controlled to turn off after the preset delay period at the end of the defrosting mode.

The above control method in some embodiments of the present disclosure may be implemented by the control apparatus 100 in some embodiments of the present disclosure. The step S36 and the step S38 may be implemented by the controlling module 2. That is, when the ambient temperature is higher than the second preset temperature threshold, the controlling module 2 is configured to control the chassis heating device 20 to turn on and off regularly; and when the ambient temperature is not higher than the second preset temperature threshold, the controlling module 2 is configured to control the chassis heating device 20 to turn on when the air conditioner 1000 is in the defrosting mode, and the controlling module 2 is configured to control the chassis heating device 20 to turn off after a preset delay period at the end of the defrosting mode. At the step S36, a cycle of turning on and off regularly is turning on for a second preset minute at an interval of a first preset minute. The range of the first preset minute is 10 to 60 minutes, and the range of the second preset minute is 10 to 60 minutes.

As such, this allows the heating device to be turned on rapidly when freezing occurs at the unit chassis 30 of the air conditioner 1000, thus avoiding the unit chassis 30 of the air conditioner 1000 from freezing, ensuring unhindered drainage at the unit chassis 30 when defrosting, and thus saving energy.

Figure 13:
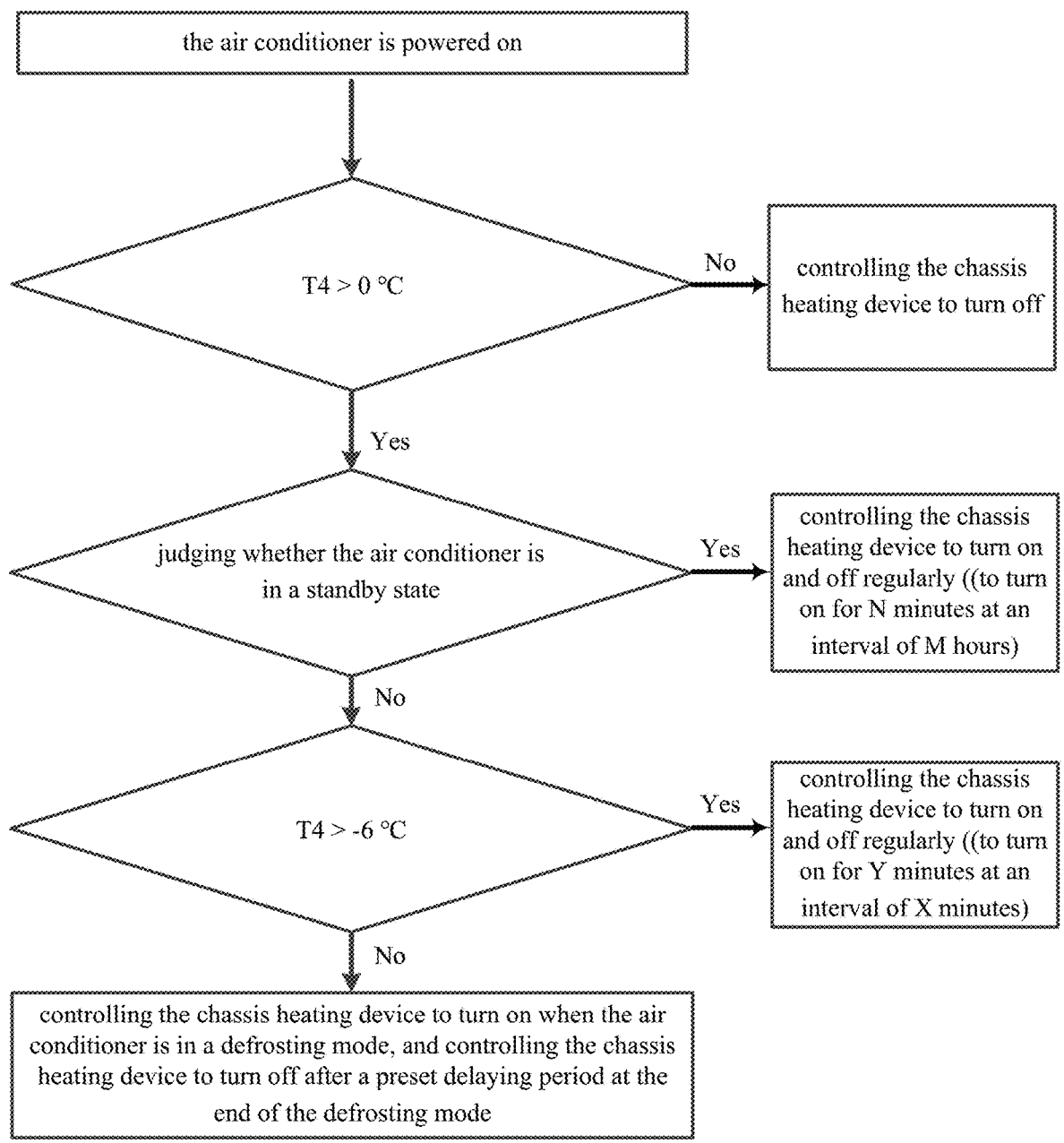
FIG. 13 is yet another flow chart showing a control method for a heating system of an air conditioner in a some embodiments of the present disclosure.

Specifically, referring to FIG. 13, in some embodiments, the first preset temperature threshold is 0° C., and the second preset temperature threshold is −6° C. It should be noted that, when the ambient temperature is between −6° C. to 0° C., the air conditioner 1000 is at a temperature within a highly icing-prone temperature range. Once the air conditioner 1000 is powered on, the obtaining module 1 begins to detect the ambient temperature, and the judging module 3 judges whether the ambient temperature is higher than 0° C. When the ambient temperature is higher than 0° C., the chassis heating device 20 is not turned on. When the ambient temperature is lower than or equal to 0° C., it is judged whether the air conditioner 1000 is in the standby state. When the air conditioner 1000 is in the standby state, the chassis heating device 20 is controlled to turn on and off regularly, for example, to turn on for N minutes at an interval of M hours. In some embodiments, M is 2 hours and N is 30 minutes. M and N may be set according to the actual situation.

When the air conditioner 1000 is not in the standby state, it is further judged whether the ambient temperature is higher than −6° C. When the ambient temperature is higher than −6° C., the chassis heating device 20 is controlled to turn on and off regularly, where a cycle of turning on and off regularly is turning on for Y minutes at an interval of X minutes. When the ambient temperature is lower than or equal to −6° C., the chassis heating device 20 is controlled to turn on when the air conditioner 1000 is in the defrosting mode, and the chassis heating device 20 is controlled to turn off after the preset delaying period, for example, after T minutes, at the end of the defrosting mode. In some embodiments, T is 30 minutes. It should be noted that when the ambient temperature is lower than or equal to −6° C., if the air conditioner 1000 is not turned on in the defrosting mode, the chassis heating device 20 does not need to be turned on at this moment. In some embodiments, the chassis heating device is turned on at the moment when the air conditioner is turned on in the defrosting mode. It should be noted that the chassis heating device 20 is controlled to turn off after the preset delaying period at the end of the defrosting mode, wherein the preset delay period is associated with the icing level of the air conditioner 1000, and the higher the icing level is, the longer the preset delay period is.

Referring to FIGS. 8 and 9, the present disclosure further provides in embodiments an air conditioner 1000, including: a control apparatus 100 as described in any of the above embodiments, and a chassis heating device 20, wherein the chassis heating device 20 is installed at a unit chassis 30 of the air conditioner 1000, and the chassis heating device 20 is configured to heat the unit chassis 30 under the control of the control apparatus 100.

In the air conditioner 1000 of a heating system in above embodiments, when the air conditioner 1000 is not in the standby state, it may control the chassis heating device 20 of the air conditioner 1000 to turn on and off according to the relationship between the ambient temperature and the second preset temperature threshold, thus allowing the heating device to be turned on rapidly when freezing occurs at the unit chassis 30 of the air conditioner 1000, thus avoiding the unit chassis 30 of the air conditioner 1000 from freezing, ensuring an unhindered drainage at the unit chassis 30 when defrosting, and saving electricity, thereby improving the using effect and operational reliability of the air conditioner 1000.

Figure 14:
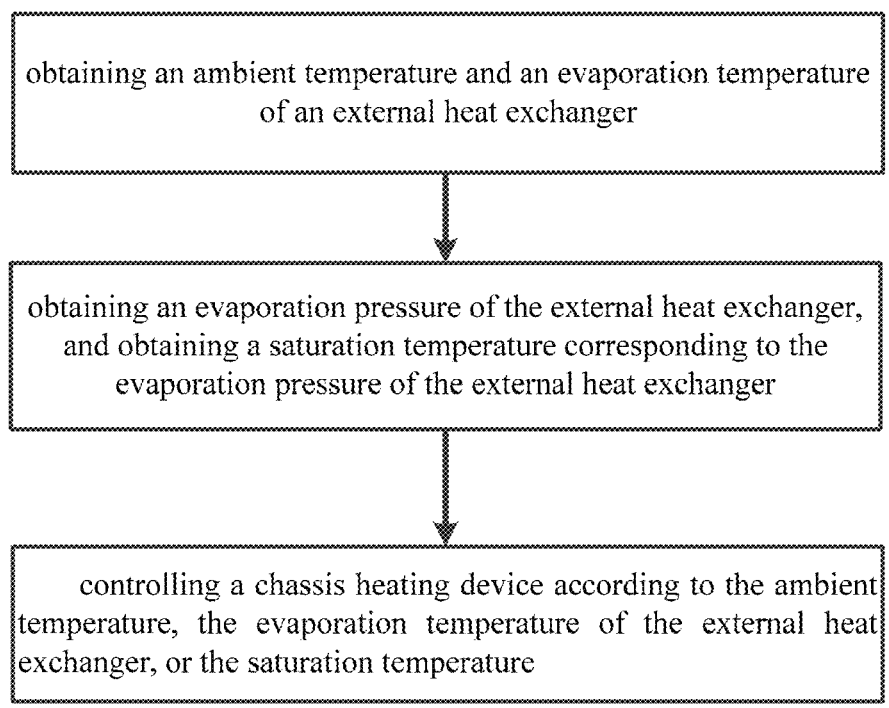
FIG. 14 is a flow chart showing a control method for a heating system of an air conditioner according to some embodiments of the present disclosure.

Specifically, as shown in FIG. 14, according to embodiments in the present disclosure, the control method for a heating system of an air conditioner obtains an ambient temperature, an evaporation temperature of an external heat exchanger; and obtains an evaporation pressure of the external heat exchanger, obtains a saturation temperature corresponding to the evaporation pressure of the external heat exchanger; controls a chassis heating device according to the ambient temperature, the evaporation temperature of the external heat exchanger, or the saturation temperature, such that the chassis heating device is controlled according to the ambient temperature, the saturation temperature corresponding to the evaporation pressure of the external heat exchanger, or the evaporation temperature of the external heat exchanger, thus avoiding the chassis of the air conditioner from freezing, and ensuring normal drainage for the chassis during defrosting, thereby improving the stability and reliability of the air conditioner.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (a control method) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A control method for a heating system of an air conditioner, comprising:
   obtaining an ambient temperature and an evaporation temperature of an external heat exchanger;
   obtaining an evaporation pressure of the external heat exchanger, and obtaining a saturation temperature corresponding to the evaporation pressure of the external heat exchanger; and
   controlling a chassis heating device according to the ambient temperature, the evaporation temperature of the external heat exchanger, or the saturation temperature comprising:
      judging whether the ambient temperature, the saturation temperature or the evaporation temperature of the external heat exchanger is higher than a first preset temperature threshold for a time period greater than or equal to a first preset duration; and
      turning off the chassis heating device, if the ambient temperature is higher than the first preset temperature threshold, or the saturation temperature or the evaporation temperature of the external heat exchanger is higher than the first preset temperature threshold for the time period greater than or equal to the first preset duration, and
      controlling the chassis heating device to turn on and off regularly when the air conditioner is in a standby state.

2. The control method according to claim 1, comprising: determining an icing level of the air conditioner according to a preset temperature range of the ambient temperature,
   wherein one preset temperature range corresponds to one icing level, and
   the higher the icing level is, the longer a turning-on period for the chassis heating device and the shorter a turning-off period for the chassis heating device are.

3. The control method according to claim 1, further comprising:
   judging whether the air conditioner is in a standby state when the ambient temperature, the saturation temperature or the evaporation temperature of the external heat exchanger is lower than or equal to a first preset temperature threshold for a time period greater than or equal to a second preset duration; and
   controlling the chassis heating device according to a second preset temperature threshold if the air conditioner is not in the standby state, wherein the second preset temperature threshold is lower than the first preset temperature threshold.

4. The control method according to claim 3, wherein controlling the chassis heating device according to a second preset temperature threshold comprises:
   controlling the chassis heating device to keep turning on, if the ambient temperature is higher than the second preset temperature threshold;
   controlling the chassis heating device to turn on when the air conditioner is in a defrosting mode, and controlling the chassis heating device to turn off after a preset delaying period at an end of the defrosting mode, if the ambient temperature is lower than or equal to the second preset temperature threshold.

5. The control method according to claim 3, wherein controlling the chassis heating device according to a second preset temperature threshold further comprises:
   controlling the chassis heating device to turn on and off regularly if the ambient temperature, the saturation temperature or the evaporation temperature of the external heat exchanger is higher than the second preset temperature threshold;
   controlling the chassis heating device to turn on when the air conditioner is in a defrosting mode, and controlling the chassis heating device to turn off after a preset delay period at an end of the defrosting mode, if the ambient temperature, the saturation temperature or the evaporation temperature of the external heat exchanger is lower than or equal to the second preset temperature threshold.

6. The control method according to claim 5, wherein a cycle of turning on and off regularly is turning on for a second preset minute at an interval of a first preset minute.

7. The control method according to claim 5, wherein controlling the chassis heating device to turn on and off regularly comprises:
   changing a cycle of turning on and off regularly for the chassis heating device according to the evaporation temperature of the external heat exchanger.

8. The control method according to claim 7, wherein changing a cycle of turning on and off regularly for the chassis heating device according to the evaporation temperature of the external heat exchanger comprises:
   setting a turning-on duration of an intermittent turning-on state for the chassis heating device as a first preset turning-on duration, and setting an interval duration of the intermittent turning-on state for the chassis heating device as a first preset interval duration, if the evaporation temperature of the external heat exchanger is higher than a first preset evaporation temperature threshold and lower than or equal to a second preset evaporation temperature threshold for a third preset duration, wherein the second preset evaporation temperature threshold is higher than the first preset evaporation temperature threshold;
   setting the turning-on duration of the intermittent turning-on state for the chassis heating device as a second preset turning-on duration, and setting the interval duration of the intermittent turning-on state for the chassis heating device as a second preset interval duration, if the evaporation temperature of the external heat exchanger is higher than the second preset evaporation temperature threshold and lower than or equal to a third preset evaporation temperature threshold for a fourth preset duration,
   wherein the third preset evaporation temperature threshold is higher than the second preset evaporation temperature threshold, and the first preset turning-on duration is greater than the second preset turning-on duration, and the second preset interval duration is less than the first preset interval duration.

9. The control method according to claim 1, wherein controlling the chassis heating device to turn on and off regularly when the air conditioner is in a standby state comprises turning on the chassis heating device for a preset minute at an interval of a preset hour.

10. A control apparatus for a heating system of an air conditioner, comprising:
    an obtaining module, configured to obtain an ambient temperature, a saturation temperature corresponding to an evaporation pressure of an external heat exchanger or an evaporation temperature of the external heat exchanger; and a controlling module, configured to control a chassis heating device according to the ambient temperature, the saturation temperature or the evaporation temperature of the external heat exchanger, wherein the control apparatus is further configured to:

judge whether the ambient temperature, the saturation temperature or the evaporation temperature of the external heat exchanger is higher than a first preset temperature threshold for a time period greater than or equal to a first preset duration;

turn off the chassis heating device, if the ambient temperature is higher than the first preset temperature threshold, or the saturation temperature or the evaporation temperature of the external heat exchanger is higher than the first preset temperature threshold for the time period greater than or equal to the first preset duration, and control the chassis heating device to turn on and off regularly when the air conditioner is in a standby state.

11. The control apparatus according to claim 10, wherein the controlling module is further configured to determine an icing level of the air conditioner according to a preset temperature range of the ambient temperature, wherein one preset temperature range corresponds to one icing level, and the higher the icing level is, the longer a turning-on period for the chassis heating device and the shorter a turning-off period for the chassis heating device are.

12. The control apparatus according to claim 10, wherein a judging module is further configured to judge whether the air conditioner is in a standby state when the ambient temperature, the saturation temperature or the evaporation temperature of the external heat exchanger is lower than or equal to the first preset temperature threshold for a time period greater than or equal to a second preset duration; and the controlling module is further configured to control the chassis heating device according to a second preset temperature threshold when the air conditioner is not in a standby state, wherein the second preset temperature threshold is lower than the first preset temperature threshold.

13. The control apparatus according to claim 12, wherein the controlling module is further configured to control the chassis heating device to keep turning on, when the ambient temperature is higher than the second preset temperature threshold;

control the chassis heating device to turn on when the air conditioner is in a defrosting mode, and control the chassis heating device to turn off after a preset delaying period at an end of the defrosting mode, when the ambient temperature is lower than or equal to the second preset temperature threshold.

14. The control apparatus according to claim 12, wherein the controlling module is further configured to control the chassis heating device to turn on and off regularly when the ambient temperature, the saturation temperature or the evaporation temperature of the external heat exchanger is higher than the second preset temperature threshold;

control the chassis heating device to turn on when the air conditioner is in a defrosting mode, and control the chassis heating device to turn off after a preset delay period at an end of the defrosting mode, when the ambient temperature, the saturation temperature or the evaporation temperature of the external heat exchanger is lower than or equal to the second preset temperature threshold.

15. The control apparatus according to claim 14, wherein a cycle of turning on and off regularly is turning on for a second preset minute at an interval of a first preset minute.

16. The control apparatus according to claim 10, wherein the controlling module is further configured to change a cycle of turning on and off regularly for the chassis heating device according to the evaporation temperature of the external heat exchanger.

17. The control apparatus according to claim 16, wherein the controlling module is further configured to set a turning-on duration of an intermittent turning-on state for the chassis heating device as a first preset turning-on duration, and set an interval duration of the intermittent turning-on state for the chassis heating device as a first preset interval duration, when the evaporation temperature of the external heat exchanger is higher than a first preset evaporation temperature threshold and lower than or equal to a second preset evaporation temperature threshold for a third preset duration, wherein the second preset evaporation temperature threshold is higher than the first preset evaporation temperature threshold; and set the turning-on duration of the intermittent turning-on state for the chassis heating device as a second preset turning-on duration, and set the interval duration of the intermittent turning-on state for the chassis heating device as a second preset interval duration, when the evaporation temperature of the external heat exchanger is higher than the second preset evaporation temperature threshold and lower than or equal to a third preset evaporation temperature threshold for a fourth preset duration, wherein the third preset evaporation temperature threshold is higher than the second preset evaporation temperature threshold, and the first preset turning-on duration is greater than the second preset turning-on duration, and the second preset interval duration is less than the first preset interval duration.

18. The control apparatus according to claim 10, wherein controlling the chassis heating device to turn on and off regularly when the air conditioner is in a standby state comprises turning on the chassis heating device for a preset minute at an interval of a preset hour.

* * * * *